US012584551B2

(12) United States Patent
Morimoto et al.

(10) Patent No.: US 12,584,551 B2
(45) Date of Patent: Mar. 24, 2026

(54) GEAR STRUCTURE

(71) Applicant: TOYOTA JIDOSHA KABUSHIKI KAISHA, Toyota (JP)

(72) Inventors: Yusuke Morimoto, Susono (JP); Takahiro Yokokawa, Susono (JP); Yoshio Ueno, Izunokuni (JP); Hiroyuki Amano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/938,686

(22) Filed: Nov. 6, 2024

(65) Prior Publication Data

US 2025/0251037 A1     Aug. 7, 2025

(30) Foreign Application Priority Data

Feb. 1, 2024     (JP) ................................. 2024-014224

(51) Int. Cl.
F16H 55/18          (2006.01)
F16H 57/12          (2006.01)
(52) U.S. Cl.
CPC ............. F16H 55/18 (2013.01); F16H 57/12 (2013.01); F16H 2057/126 (2013.01)

(58) Field of Classification Search
CPC .... F16H 55/18; F16H 2055/185; F16H 57/12; F16H 2057/126
See application file for complete search history.

(56) References Cited

FOREIGN PATENT DOCUMENTS

| FI | 122037 | B | * | 7/2011 | ........... F03D 7/0204 |
|---|---|---|---|---|---|
| JP | 2009-250321 | A | | 10/2009 | |
| JP | 2009261123 | A | * | 11/2009 | |
| JP | 2010-169152 | A | | 8/2010 | |
| JP | 2020-020354 | A | | 2/2020 | |

* cited by examiner

*Primary Examiner* — Bobby Rushing, Jr.
(74) *Attorney, Agent, or Firm* — SoraIP, Inc.

(57)          ABSTRACT

A gear structure of a vehicle, which is rotatably provided on a first gear meshing with each other in a rotational direction, and rotates by being pressed by a tooth flank of a second gear when meshed with the second gear, and a sliding member which is connected to the pivoting member so as to be movable in a direction opposite to the rotational direction of the first gear and is pressed by the pivoting member and slides in a direction opposite to the rotational direction, and a protruding member which is rotatably provided along the rotational direction and is pressed by the sliding member and protrudes between the tooth flanks of the second gear.

4 Claims, 5 Drawing Sheets

GEAR STRUCTURE

CROSS-REFERENCE TO RELATED APPLICATION

This application claims priority to Japanese Patent Application No. 2024-014224 filed on Feb. 1, 2024, incorporated herein by reference in its entirety.

BACKGROUND

1. Technical Field

The present disclosure relates to a gear structure used for a small-sized mobility device.

2. Description of Related Art

Japanese Unexamined Patent Application Publication No. 2010-169152 (JP 2010-169152 A) describes technology including a scissors gear and a scissors spring in order to reduce generation of noise caused by backlash in a gear.

SUMMARY

Now, there is demand regarding small-sized mobility devices, which are used in a low-speed range, to be able to perform speed follow-up as instructed by a control device, in power transmission by gears. However, with power transmission by gears used in the low-speed range, when a rotational direction of the gears changes, spinning of the gears occurs due to backlash in the gears, causing speed follow-up in accordance with instructions to deteriorate, and accordingly there is room for improvement.

The present disclosure has been made in view of the above, and an object thereof is to provide a gear structure capable of improving speed follow-up as instructed, even when the rotation directions of gears change.

In order to address the above issue and achieve the object, a gear structure according to the present disclosure is a gear structure of a vehicle, the gear structure including: a pivoting member that is provided on one gear of gears meshing with each other so as to be rotatable in a rotation direction, such that when the one gear meshes with the other gear, the pivoting member rotates by being pressed by a tooth flank of the other gear; a sliding member that is connected to the pivoting member so as to be movable in a direction opposite to the rotation direction of the one gear, and that slides in the direction opposite to the rotation direction by being pressed by the pivoting member; and a protruding member that is provided so as to be rotatable along the rotation direction, and that is pressed by the sliding member so as to protrude between tooth flanks of the other gear.

Also, a gear structure according to the present disclosure is a gear structure of a vehicle, the gear structure including: a protruding portion that is provided on one gear of gears meshing with each other so as to be protrudable between tooth flanks meshing with the other gear; and a valve device that supplies oil to the protruding portion via a tube, and that controls opening and closing of a hydraulic valve to adjust hydraulic pressure of the protruding portion. The valve device causes the protruding portion to protrude when the other gear and the one gear mesh with each other.

According to the present disclosure, advantageous effects can be obtained in that the speed follow-up as instructed can be improved, even when the rotational direction of the gear changes.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
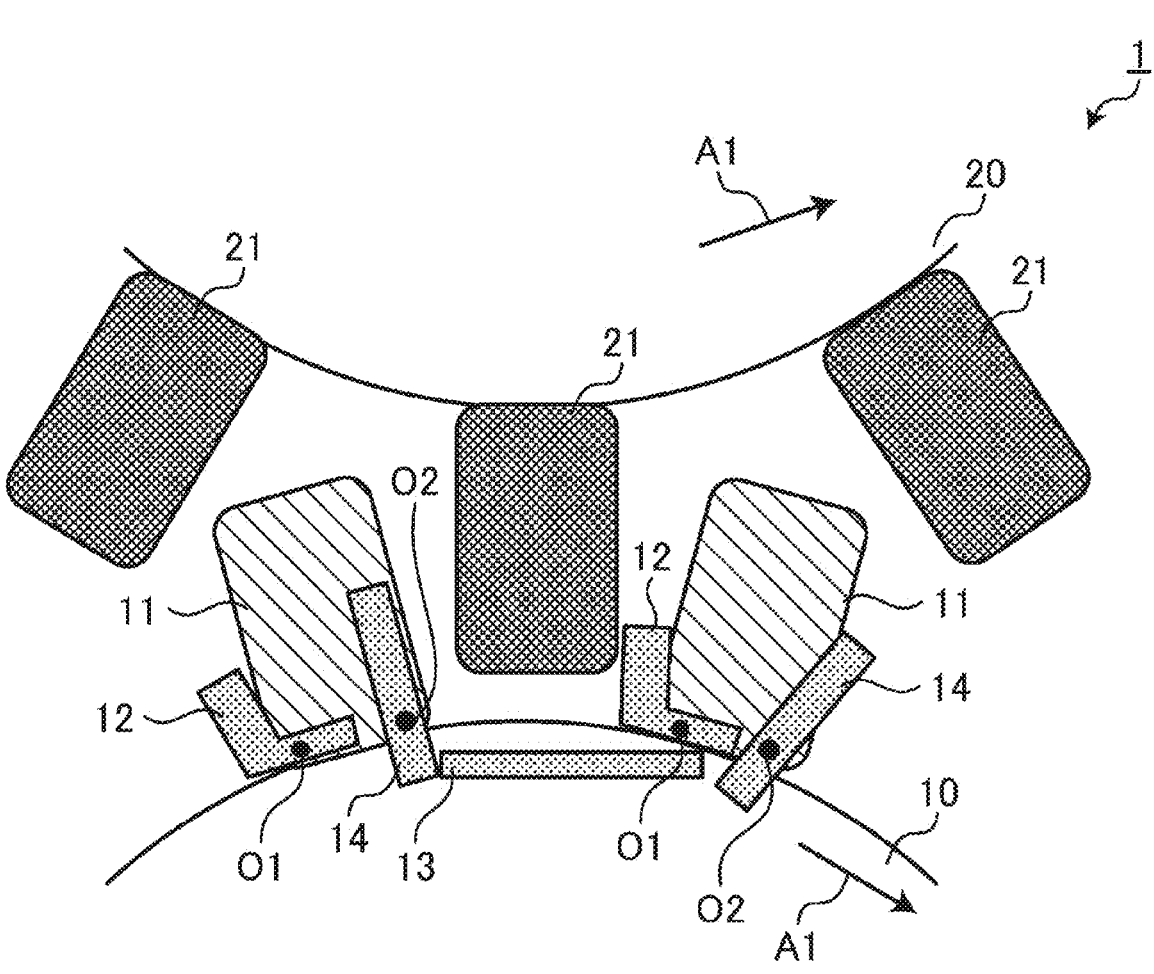
FIG. 1 is a schematic diagram illustrating a schematic configuration of a gear structure used for small mobility according to Embodiment 1.

Hereinafter, a gear structure used for small mobility according to an embodiment of the present disclosure will be described with reference to the drawings. The constituent elements in the following embodiments include those that can be easily replaced by a person skilled in the art or those that are substantially the same. In addition, the drawings referred to in the following description only schematically show shapes, sizes, and positional relationships to the extent that the contents of the present disclosure can be understood. That is, the present disclosure is not limited to only the shapes, sizes, and positional relationships illustrated in the drawings.

I. Embodiment 1

Configuration of Gear Structure

FIG. 1 is a schematic diagram illustrating a schematic configuration of a gear structure used for small mobility according to a first embodiment. The gear structure 1 shown in FIG. 1 is used in an electric vehicle with small mobility. The gear structure 1 comprises a first gear 10 and a second gear 20 which mesh with one another. Each of the first gear 10 and the second gear 20 is provided with teeth 11 and teeth 21 at a predetermined pitch-width, and is rotated in the same rotation direction A1 by meshing of the teeth with each other. In Embodiment 1, the first gear 10 functions as one gear, and the second gear 20 functions as the other gear. One of the first gear 10 and the second gear 20 is coupled to a shaft (not shown) connected to a drive system such as a motor (not shown). The gear rattling is rattling caused when the teeth 11 of the first gear 10 and the teeth 21 of the second gear 20 mesh with each other.

The first gear 10 comprises a pivoting member 12, a sliding member 13 and a protruding member 14. The pivoting member 12, the sliding member 13, and the protruding member 14 are provided on each of the plurality of teeth 11 provided at a predetermined pitch.

The pivoting member 12 has a substantially L-shaped cross section and is provided in the first gear 10 so as to be rotatable with respect to the rotation direction A1 of the first gear 10. Specifically, the pivoting member 12 is provided in the first gear 10 so as to be rotatable about the shaft O1 as a rotary shaft. Further, the pivoting member 12 is provided on the teeth 11 side of the first gear 10 opposite to the rotation direction A1. When meshing with the teeth 21 of the second gear 20, the pivoting member 12 is pressed in the rotation direction A1 by the tooth flank of the second gear 20 and rotates.

The sliding member 13 has a plate-like cross section, and one of the sliding members is connected to the pivoting member 12 so as to be movable in a direction opposed to the rotation direction A1 of the first gear 10. One of the sliding members 13 is pressed by the pivoting member 12 and slides in a direction opposite to the rotation direction of the first gear 10.

The protruding member 14 is rotatably provided along the rotation direction. Specifically, the protruding member 14 has a plate-like cross section and is provided on the teeth 11 of the first gear 10 so as to be rotatable about the shaft O2. The lower end side of the protruding member 14 is pressed by the other of the sliding members 13, and the upper end side protrudes between the tooth flanks of the second gear 20.

Operation of Gear Structure

Figure 2:
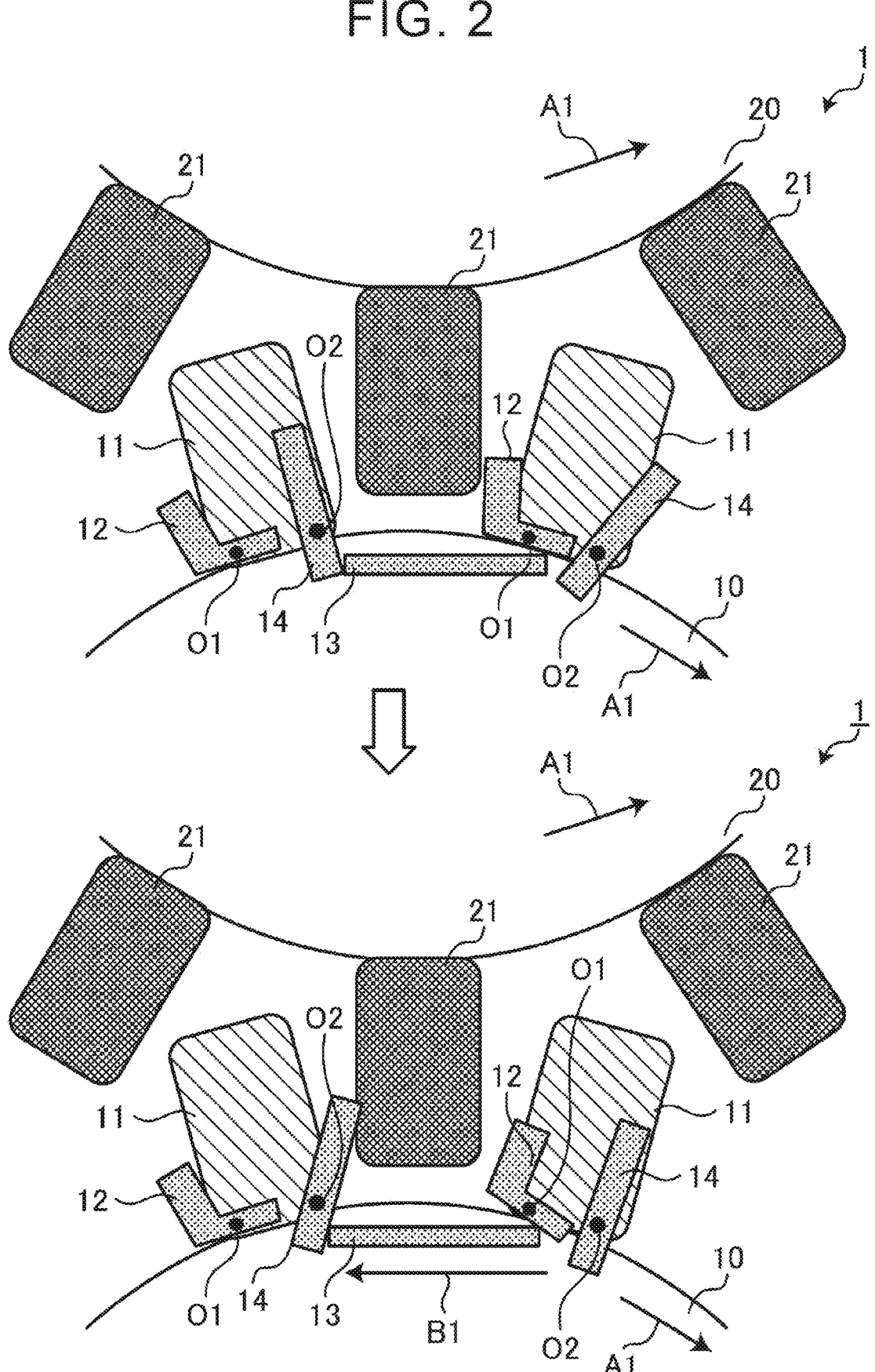
FIG. 2 is a diagram for explaining the operation of the gear structure.

Next, the operation of the above-described gear structure 1 will be described. FIG. 2 is a diagram illustrating an operation of the gear structure 1.

As shown in FIG. 2, the pivoting member 12, when meshing with the teeth 21 of the second gear 20, is pressed in the rotation direction A1 by the tooth flank of the second gear 20 to rotate (upper view of FIG. 2→the lower view of FIG. 2). Here, one of the sliding members 13 is pressed by the pivoting member 12 and slides in a direction B1 opposite to the rotation direction A1 of the first gear 10 (upper view of FIG. 2→lower view of FIG. 2). The lower end side of the protruding member 14 is pressed by the other of the sliding members 13, and the upper end side protrudes between the tooth flanks of the second gear 20 (upper view of FIG. 2→lower view of FIG. 2). Accordingly, in the gear structure 1, the upper end side of the protruding member 14 protrudes between the tooth flanks of the teeth 11 of the first gear 10 and the tooth flanks of the teeth 21 of the second gear 20, so that the gear rattling can be filled. Even in a case where the rotational direction of the gear changes, it is possible to improve the speed tracking as instructed.

According to the first embodiment described above, when the pivoting member 12 meshes with the teeth 21 of the second gear 20, the rotation member is pressed in the rotation direction A1 by the tooth flank of the second gear 20 and rotates. One of the sliding members 13 is pressed by the pivoting member 12 so as to slide in B1 opposite to the rotation direction A1 of the first gear 10, and the lower end side of the protruding member 14 is pressed by the other of the sliding members 13 so that the upper end side protrudes between the tooth flanks of the second gear 20, so that the gear rattling can be filled. Even in a case where the rotational direction of the gear changes, it is possible to improve speed tracking as instructed.

Further, according to the first embodiment, the lower end side of the protruding member 14 is pressed by the other of the sliding member 13, the upper end side is protruded between the tooth flanks of the second gear 20 to eliminate the gap, the teeth 11 of the first gear 10 and the teeth 21 of the second gear 20 can be reduced striking noise when meshing.

II. Embodiment 2

Next, a second embodiment will be described. In the first embodiment, even when the rotational direction of the gear is changed by the mechanical method, the speed following as instructed is improved, but in the second embodiment, even when the rotational direction of the gear is changed by the hydraulic method, the speed following as instructed is improved. Hereinafter, the general configuration of the gear structure according to the second embodiment will be described, and the operation of the gear structure according to the second embodiment will be described. The same components as those of the gear structure 1 according to the first embodiment are denoted by the same reference numerals, and detailed description thereof will be omitted.

Figure 3:
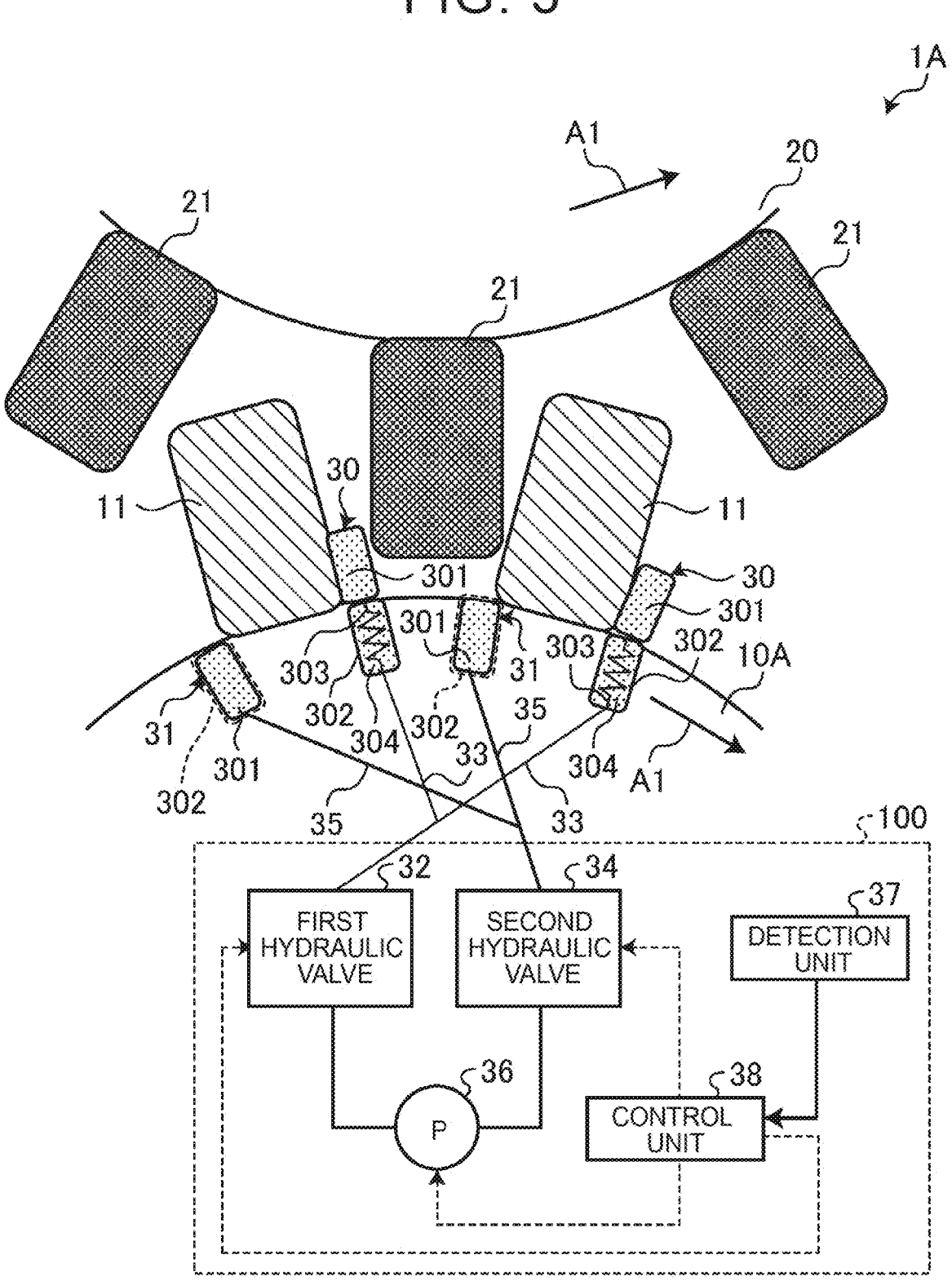
FIG. 3 is a schematic diagram illustrating a schematic configuration of a gear structure used for small mobility according to Embodiment 2.
Figure 4:
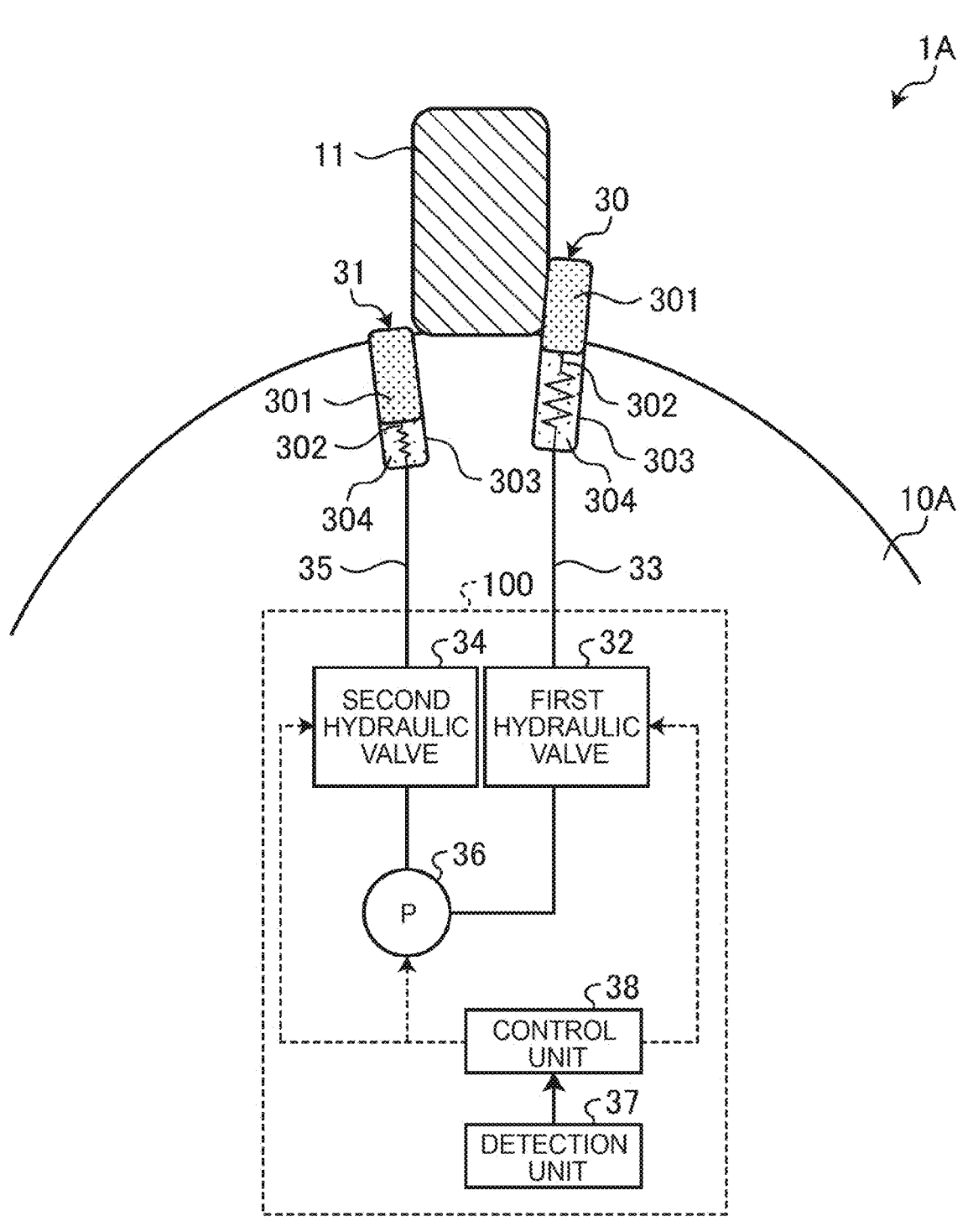
FIG. 4 is a schematic diagram illustrating a schematic configuration of a first gear in a gear structure used for small mobility according to Embodiment 2.

FIG. 3 is a schematic diagram illustrating a schematic configuration of a gear structure used for small mobility according to Embodiment 2. FIG. 4 is a schematic diagram illustrating a schematic configuration of a first gear in a gear structure used for small mobility according to Embodiment 2. The gear structure 1A shown in FIGS. 3 and 4 includes a first gear 10A instead of the first gear 10 according to the first embodiment described above.

The first gear 10A includes a first protruding portion 30, a second protruding portion 31, a first hydraulic valve 32, a first tube 33, a second hydraulic valve 34, a second tube 35, a pump 36, a detection unit 37, and a control unit 38.

The first protruding portion 30 is provided on one side in the direction of rotation of the teeth 11 and is connected to the pump 36 via the first tube 33 and the first hydraulic valve 32. The first protruding portion 30 includes a protruding member 301 that can protrude between tooth flanks meshing with the second gear 20, a housing portion 302 that houses the protruding member 301, a biasing member 303 such as a spring that biases the protruding member 301 between tooth flanks, and oil 304 filled in the housing portion 302.

The second protruding portion 31 is provided on the other side in the rotational direction of the teeth 11, and is connected to the pump 36 via the second tube 35 and the second hydraulic valve 34. The second protruding portion 31 includes, like the first protruding portion 30, a protruding member 301 that can protrude between tooth flanks meshing with the second gear 20, a housing portion 302 that houses the protruding member 301, a biasing member 303 such as a spring that biases the protruding member 301 between tooth flanks, and oil 304 filled in the housing portion 302.

The first hydraulic valve 32 is connected to the first protruding portion 30 and the pump 36 via a first tube 33. The first hydraulic valve 32 is opened and closed under the control of the control unit 38.

The second hydraulic valve 34 is connected to the second protruding portion 31 and the pump 36 via the second tube 35. The second hydraulic valve 34 is opened and closed under the control of the control unit 38.

Under the control of the control unit 38, the pump 36 supplies the oil 304 to the first protruding portion 30 via the first hydraulic valve 32 and the first tube 33, and supplies the oil 304 to the second protruding portion 31 via the second hydraulic valve 34 and the second tube 35.

The detection unit 37 detects the rotational speed of at least one of the first gear 10A and the second gear 20, and outputs the detection result to the control unit 38. Specifically, the detection unit 37 is configured by using a resolver or the like that detects a rotation angle of a drive unit such as a motor (not shown).

The control unit 38 controls the first hydraulic valve 32, the second hydraulic valve 34, and the pump 36 based on the detection result of the detection unit 37. When the teeth 21 of the second gear 20 and the teeth 11 of the first gear 10A are meshed, the first protruding portion 30 or the second protruding portion 31 protrudes between tooth flanks meshing with the second gear 20 and is raised. The control unit 38 controls the first hydraulic valve 32, the second hydraulic valve 34, and the pump 36 based on the detection result of the detection unit 37. By lowering the hydraulic pressure of the first protruding portion 30 or the second protruding portion 31, the force of the biasing member 303 contracts to a natural length, and the protruding member 301 is retracted from between tooth flanks meshing with the second gear 20. In the second embodiment, the first hydraulic valve 32, the first tube 33, the second hydraulic valve 34, the second tube 35, the pump 36, the detection unit 37, and the control unit 38 function as the valve device 100.

Processing by the Control Unit

Figure 5:
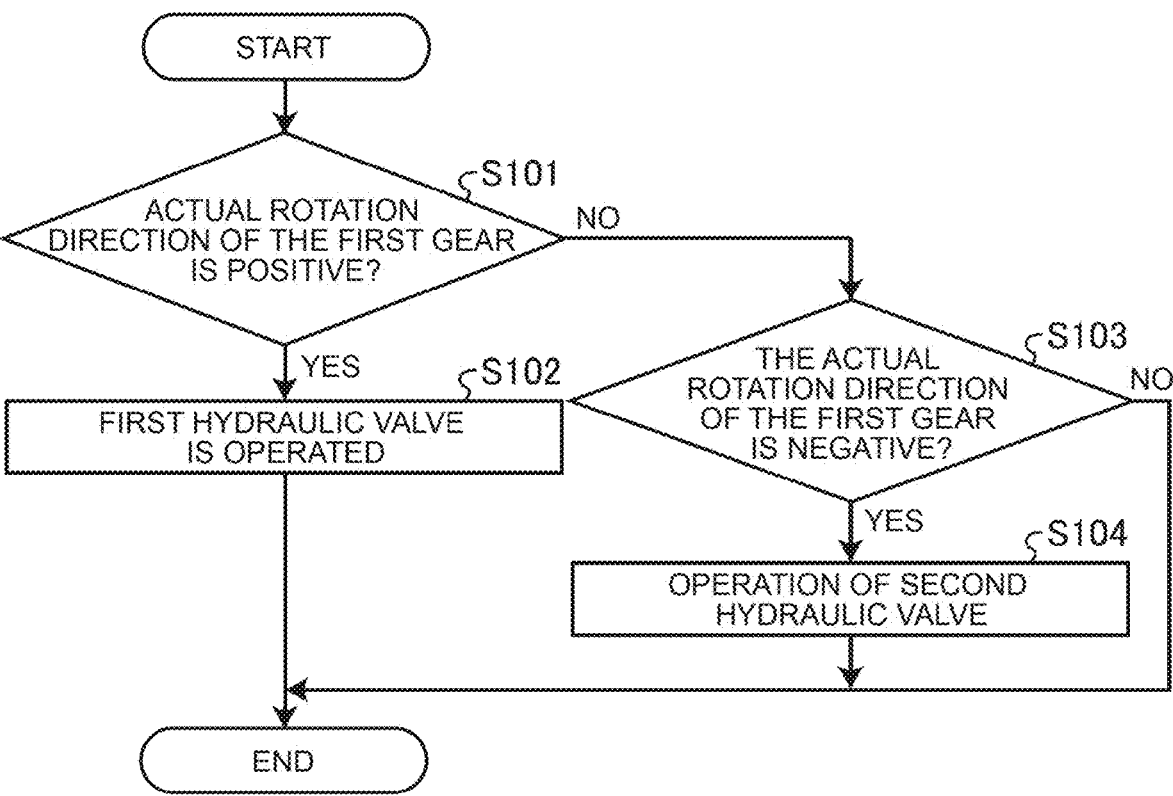
FIG. 5 is a flowchart illustrating an outline of processing executed by a control unit according to Embodiment 2.

Next, processing executed by the control unit 38 will be described. FIG. 5 is a flowchart illustrating an outline of processing executed by the control unit 38. Note that the following processing executed by the control unit 38 is executed at a faster cycle than an instruction indicating the moving direction of the miniaturized mobility.

As illustrated in FIG. 5, the control unit 38 determines whether or not the actual rotation direction of the first gear 10A is positive (rotation direction A1 in FIG. 3) based on the detection result of the detection unit 37 (S101), and when the actual rotation direction of the first gear 10A is positive (S101: Yes), operates the first hydraulic valve 32 (S102). Thus, even when the first gear 10A rotates in the actual rotational direction, it is possible to fill the backlash in the gear, and it is possible to improve the follow-up speed as instructed. After S102, the control unit 38 ends this process.

In S101, when the actual rotational direction of the first gear 10A is not positive (S101: No), the control unit 38 shifts to S103.

Subsequently, the control unit 38 determines whether or not the actual rotation direction of the first gear 10A is negative (the opposite direction of the rotation direction A1 in FIG. 3) based on the detection result of the detection unit 37 (S103), and when the actual rotation direction of the first gear 10A is negative (S103: Yes), operates the second hydraulic valve 34 (S104). Thus, even when the first gear 10A rotates in a direction opposite to the actual rotational direction, the gear rattling can be filled, and the speed-following as instructed can be improved. After S104, the control unit 38 ends this process.

In S103, if the actual rotational orientation of the first gear 10A is negative (S103: No), the process is housed.

According to Embodiment 2 described above, the control unit 38 determines the actual rotational direction of the first gear 10A based on the detection result of the detection unit 37. Since the first hydraulic valve 32 or the second hydraulic valve 34 is operated on the basis of the determination result, even when the rotational direction of the first gear 10A changes, the gear rattling can be filled, and the following speed can be improved as instructed.

OTHER FORMS

Additional benefits and variations can be readily derived by one of ordinary skill in the art. The broader aspects of the disclosure are not limited to the specific details and representative embodiments presented and described above.

Accordingly, various modifications may be made without departing from the spirit or scope of the general inventive concept as defined by the appended claims and their equivalents.

While some of the embodiments of the present application have been described in detail with reference to the drawings, these are merely examples, and the present disclosure can be implemented in other forms in which various modifications and improvements are made based on the knowledge of a person skilled in the art, including the aspects described in the section of the disclosure of the present disclosure.

What is claimed is:

1. A gear structure of a vehicle, the gear structure comprising:

a pivoting member that is provided on one gear of gears meshing with each other so as to be rotatable in a rotation direction, such that when the one gear meshes with the other gear, the pivoting member rotates by being pressed by a tooth flank of the other gear;

a sliding member that is connected to the pivoting member so as to be linearly movable in a direction opposite to the rotation direction of the one gear, and that slides in the direction opposite to the rotation direction by being pressed by the pivoting member; and a protruding member that is provided so as to be rotatable along the rotation direction, and that is pressed by the sliding member so as to protrude between tooth flanks of the other gear, wherein the pivoting member has an L-shaped cross section in a plane perpendicular to a shaft provided on the one gear, is rotatably supported about the shaft, and is disposed on a side of a tooth of the one gear opposite to the rotation direction; and wherein an end of the protruding member is pressed by the sliding member, and the other end of the protruding member protrudes between the tooth flank of the other gear and a tooth flank of a tooth of the one gear that is located one tooth behind the tooth having the pivoting member, in the rotation direction.

2. The gear structure according to claim 1, wherein each of the pivoting member, the sliding member, and the protruding member is provided for each tooth of the one gear at a predetermined pitch.

3. The gear structure according to claim 1, wherein the other end of the protruding member protrudes between the tooth flank of the other gear and the tooth flank of the tooth of the one gear that is located on a side opposite to a tooth flank which the pivoting member contacts, relative to the rotation direction.

4. The gear structure according to claim 1, wherein the other end of the protruding member protrudes between the tooth flank of the other gear and the tooth flank of the tooth of the one gear that is located adjacent in a reverse rotation direction to the tooth on which the pivoting member is provided.

* * * * *